June 19, 1934. J. MACALISTER 1,963,500
MANURE DISTRIBUTOR
Filed Feb. 3, 1932
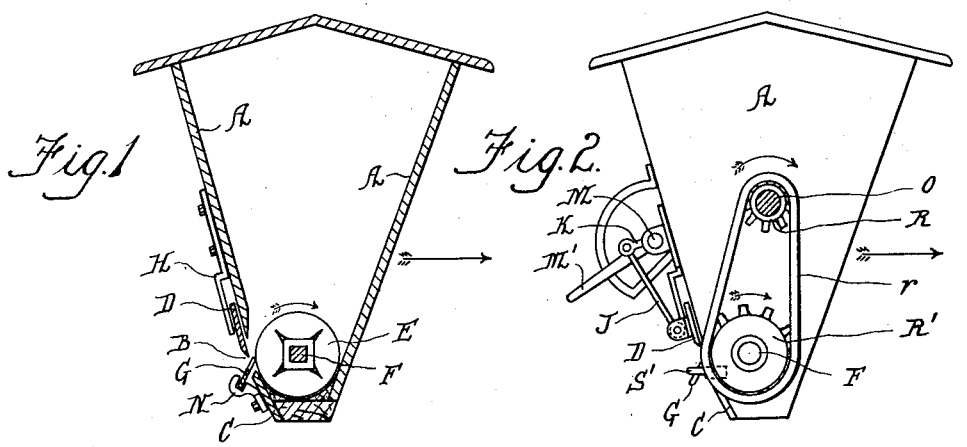
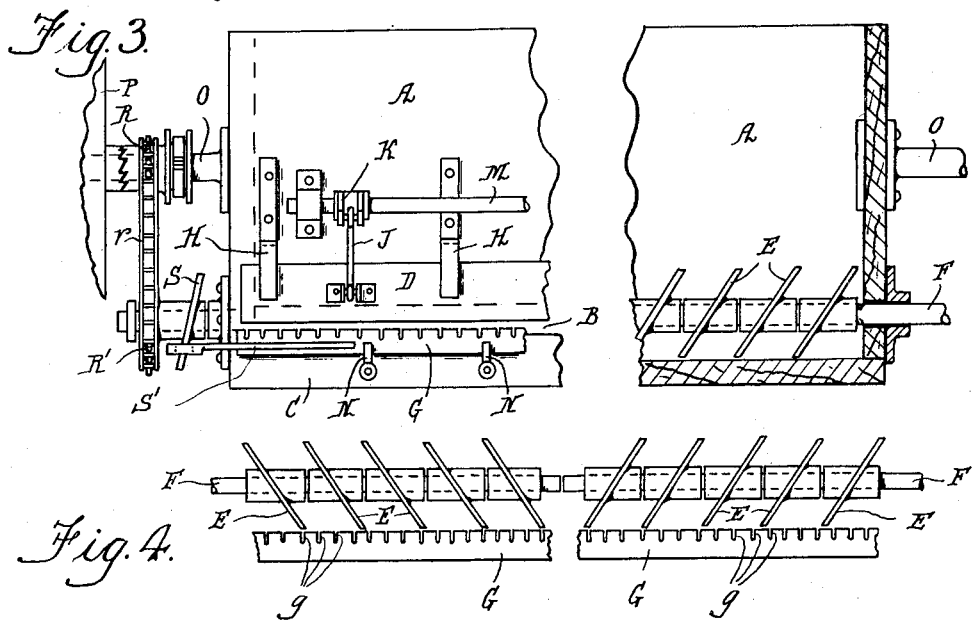
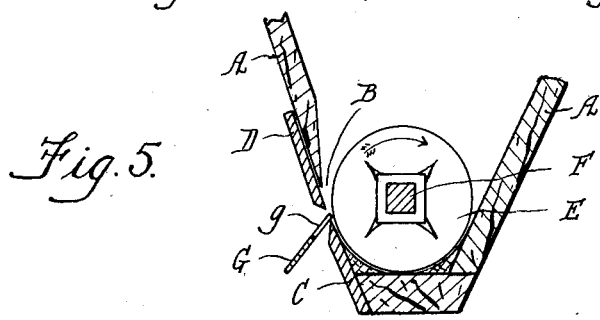

Patented June 19, 1934

1,963,500

UNITED STATES PATENT OFFICE 1,963,500

MANURE DISTRIBUTOR

James Macalister, Invercargill, New Zealand

Application February 3, 1932, Serial No. 590,574
In New Zealand February 25, 1931

3 Claims. (Cl. 221—130)

This invention has been devised with the object of providing an improved construction of distributor for manure, for use more particularly in the treatment of grass lands by the spreading of artificial fertilizers thereon.

While the machine forming the subject of the invention is described in this specification as being used specially for manure distribution, it may so far as its special features of novelty are concerned, be readily adapted for the sowing or distribution of seeds or for the simultaneous sowing of manure and seed. Also it may be combined with drills or like appliances.

The machine devised for this purpose provides by its novel features of construction and operation, for the feeding of the manure from the containing hopper being controlled and regulated to allow of a minimum quantity being as effectually and evenly spread over the surface as larger quantities. They also provide that the feeding means shall be automatically kept clear from clogging with the manure, and thus the sowing or distribution made capable of regulation down to very small quantities.

The invention consists mainly in the combination with a hopper that is mounted in the usual manner upon a travelling frame and is constructed with a delivery slot, adjustable in width, upon its rear side, of a rotating feeding device of special nature arranged within the bottom of the hopper, and consists also in the use therewith of a reciprocating feeder plate also of special nature arranged to enter the said slot, the whole operating to provide for the manure being kept agitated and fed from the delivery slot in amounts governed by the width thereof, to trickle down over and through the feeder plate.

These features of construction and operation are illustrated in the accompanying drawing and will be hereinafter more fully described in relation to such drawing, in which:—

Figure 1 is a sectional end elevation of the manure hopper and its assembled parts.

Figure 2 is an end elevation thereof.

Figure 3 is a rear elevation of the hopper with the central part broken away and with one end shown in section.

Figure 4 is a plan of the manure feeding device and of the feeder plate associated therewith, removed from the hopper.

Figure 5 is an enlarged cross sectional detail of the hopper bottom with the manure feeding device and feeder plate shown in their relative positions and illustrating the manner in which these operate in the distribution of the manure.

The essential features of novelty in this invention are concerned with the provision of the special means shown in Figures 4 and 5 in a manure distributing machine of ordinary travelling hopper type, to ensure of the feed or delivery of the manure in quantities determined by the degree of opening of a delivery slot in the rear of the hopper.

These means comprise the hopper A made of ordinary tapering form in cross section and also made with a slot opening B in its rear extending along its length, the bottom of which is formed by a fixed plate C while its top is formed by the plate D mounted against the hopper and made movable up or down in relationship to the fixed plate and thus to regulate the width of the opening to any degree between a minimum and a maximum. Combining with the hopper are a series of discs E fixed side by side upon a spindle F that extends longitudinally through the hopper length and so disposed that the edges of the discs just clear the hopper bottom and just clear the inside surface of the hopper rear. The delivery slot B is disposed at such a height relatively to these discs that its bottom edge is somewhat below the level of the disc's centre, and thus provides that the discs as they rotate in direction such that their rearward portions move upwardly, will move across the slot edges. Each disc is given an inclination to the vertical plane and this is made of such a degree that the longitudinal throw of its edge in its rotation, will overlap with the throws of those next to it. They thus form wave plates in their action upon the manure.

If therefore the hopper A be charged with manure and the discs rotated in the direction indicated by the rotation of their spindle, the discs in their action upon the body of the manure will act to keep it broken up into fine nature and will also lift it and cause it to dribble out through the slot B along the full length thereof, at a rate dependent upon the amount of opening of such slot.

Also combining with the hopper opening B and with these rotating feeding means, is a feeder plate G of thin nature and of approved width, that is arranged to extend with its upper edge into the opening so that it approaches the edges of the discs E, and then inclines outwardly and downwardly across the lower edge of the opening. This plate extends for the full length of the opening and in the working of the machine is subjected to a longitudinal reciprocatory movement at a medium rate. It will thus act to keep the opening clear of any obstruction through the manure tending to become clogged or lumpy and thus ensure of the free flow of the manure out through the opening, no matter to what extent it is closed. To aid its action in this manner the top edge of the plate may be made with short slots g extending in for a short distance and positioned at frequent intervals apart along its length. The formation of the upper edge of the plate with these slots will provide that by closing the top plate D of the feed slot B right down on to the plate, minute apertures are formed by these slots out through which exceedingly small quantities of manure may be fed, thus providing for finer regulation of the quantity distributed.

It is also considered advisable that the timing of the plate's travel to and fro should be such as to cause its travel in each direction to be in a contrary direction to the lateral movement of the disc's peripheries as they rotate across the plate edge.

These essential features may be employed in a construction of machine in a number of different ways to suit any special circumstances and in a manner such as to provide for the disc spindle F being rotated, and the plate G moved reciprocally through the travel of the hopper carrying means, or through independent driving means.

In the drawing, Figures 1 to 3, they are shown as arranged and operated in a suitable manner, the machine so far as its discs E and feeder plate G are concerned, being made up of two sections one for each half length of the hopper and being independently driven by the respective end wheels of the hopper support. The discs of the two sets may be oppositely inclined as shown in Figure 4.

In these details of construction the adjusting plate D of the slot opening B is held in position upon the rear of the hopper by fitting beneath guide straps H affixed at intervals along the hopper and is supported by suspension upon the lower ends of the links J, the upper ends of which are connected to crank arms K radiating from a spindle M that is journalled along the hopper rear above. This spindle is adapted to be turned by means of a handle lever M' affixed to it and in its turning to thereby raise or lower the plate D. Any approved means are provided for locking this handle lever in any position desired.

The feeder plate G is supported in small guide brackets N secured to the hopper rear beneath and disposed at desired intervals apart along the length thereof.

At each end of the hopper A, a stub axle O is secured and upon this the supporting and travelling wheel P (Figure 3) is journalled. Associated with the wheel upon the axle is a sprocket wheel R that is adapted in a well known manner to be clutched to the wheel to rotate therewith, or to be freed therefrom. The end of the disc spindle F is carried out through the hopper end and has a sprocket wheel R' secured thereto and these two sprocket wheels are encircled by a sprocket chain r so that the desired rotation is imparted to the spindle and its discs through the travel of the machine, such rotation thus causing the discs to rotate in the direction required and as before described.

Also fixed upon the spindle end is a cam disc S made with an approved throw, and attached to the feeder plate G is a rod S' that projects past the edge of this cam disc and is forked at its extremity with forks so arranged that they project inwards one on each side of the cam disc. In the rotation of the spindle therefore, the cam disc will impart the reciprocations to this feeder plate.

The discs E may be fixed and spaced apart upon the spindle F in any approved manner as for instance by forming the portion of the spindle concerned, of square cross sectional shape, and providing each disc with a boss e of the necessary length that is made with a bore of corresponding cross sectional shape.

I claim:—

1. In means for the purposes described, the combination with a hopper made with a slot opening extending longitudinally along its rear side at a distance up from the bottom edge thereof, of a set of discs fixed upon a spindle extending longitudinally through the hopper near its bottom and each of which discs is made to incline in the vertical plane, and of a plate disposed to extend longitudinally with the hopper so that its upper edge enters the said slot at an upward inclination across the lower edge thereof and approaches the peripheral edges of the discs, and means whereby the said spindle with its discs may be caused to rotate and the said plate may be moved reciprocally longitudinally through the travel of the hopper.

2. In means for the purposes herein described and as covered by claim 1, a reciprocating plate formed with closely positioned slots extending inwardly upon its upper edge, and approaching the peripheral edges of the discs substantially as and for the purposes specified.

3. In a manure distributor according to claim 1, a slot opening for the hopper made of regulatable width by forming its lower edge as a fixture and its upper edge as a vertically adjustable plate.

JAMES MACALISTER.